(12) United States Patent
Imielinski et al.

(10) Patent No.: US 6,240,448 B1
(45) Date of Patent: May 29, 2001

(54) METHOD AND SYSTEM FOR AUDIO ACCESS TO INFORMATION IN A WIDE AREA COMPUTER NETWORK

(75) Inventors: Tomasz Imielinski, North Brunswick; Aashu Virmani, Bridgewater, both of NJ (US)

(73) Assignee: Rutgers, The State University of New Jersey, Piscataway, NJ (US)

( * ) Notice: Subject to any disclaimer, the term of this patent is extended or adjusted under 35 U.S.C. 154(b) by 0 days.

(21) Appl. No.: 09/091,591
(22) PCT Filed: Dec. 20, 1996
(86) PCT No.: PCT/US96/20409
  § 371 Date: May 7, 1999
  § 102(e) Date: May 7, 1999
(87) PCT Pub. No.: WO97/23973
  PCT Pub. Date: Jul. 3, 1997

Related U.S. Application Data
(60) Provisional application No. 60/009,153, filed on Dec. 22, 1995.

(51) Int. Cl.[7] .............................. H04L 12/16; H04M 1/64
(52) U.S. Cl. ........................ 709/218; 709/246; 379/90.01
(58) Field of Search .................................. 709/229, 217, 709/218, 219, 246; 379/88.15, 90.01, 93.01, 93.25, 101.01

(56) References Cited

U.S. PATENT DOCUMENTS

| | | | |
|---|---|---|---|
| 5,297,249 | 3/1994 | Bernstein et al. | 345/356 |
| 5,305,375 | 4/1994 | Sagara et al. | 379/88.27 |
| 5,349,636 | 9/1994 | Irribarren | 379/88.15 |
| 5,351,276 | 9/1994 | Doll, Jr. et al. | 379/88.17 |

*Primary Examiner*—Dung C. Dinh
(74) *Attorney, Agent, or Firm*—Mathews, Collins, Shepherd & Gould, P.A.

(57) ABSTRACT

Method and system for representing different types of information on a wide area network in a form suitable for access over an audio interface (12). Audio enabled pages (29) are created to link particular text data, which data can be from the World Wide Web (WWW). The audio enabled pages (29) can be retrieved by an audio web server (16, 18) for interpreting the pages into audio which is displayed at the audio interface (12). Audio input means are created to traverse the links of the audio enable pages (29). A user can use the keypad of the phone (12) or spoken commands to traverse the audio menus. In addition, dynamic audio input means can be created to selectively traverse a database of the WWW information.

31 Claims, 5 Drawing Sheets

METHOD AND SYSTEM FOR AUDIO ACCESS TO INFORMATION IN A WIDE AREA COMPUTER NETWORK

This Application claims benefit of Provisional Appln No. 60/009,153 Dec. 22, 1995.

BACKGROUND OF THE INVENTION

1. Field of the Invention

The present invention relates to a method and system for audio access to resources in a wide area public network, such as the Internet.

2. Description of the Prior Art

The number of users of wide area computer networks such as the Internet and the World Wide Web (WWW) is growing exponentially. A number of information services and resources are currently offered on the Internet and WWW. The underlying framework of these services is what a user enters a query on a computer which has access to the Internet. The user can input an address of the resource or can use a search engine for conducting a search of available resources. The query is processed and a connection between the user and a site on the Internet is established with a conventional protocol, such as http. A set of answers are generated and are returned to the user's computer using the protocol For example, stock quote searchable resources have been developed which include information directed to the prices of stocks in different stock markets. A user can query a particular stock, i.e., IBM, or index, i.e., utilities, and the resource returns a set of prices satisfying the query. One problem with accessing the WWW resources is that a user must have access to a computer which is connected to the Internet. However, the majority of the world's population does not have access to a computer. Also, a user that is away from their office or home where their home or office computer is located, and is without a portable laptop computer, is not in the position to access the Internet.

There exists current state of the art audio products on the WWW for embedding audio into a Web page or transmitting full duplex phone conversation over the Internet. The WWW is formed of Web pages authored in a language referred to as hypertext mark-up language (HTML). The products digital the audio or phone conversation with a sound card. The digitized audio is encoded for compressing the audio data in order to provide real time connections over the Internet. The encoded data can be embedded into a Web page by linking the Web page to the encoded data with functions specified in HTML. After a user accesses the Internet with a computer, the user's Web browser receives the encoded audio data when the user accesses the Web page. A user can play the audio on a media player at the user's site by the user clicking on an audio link in the Web page. Alternatively, the encoded audio data can be directly transmitted across the Internet, i.e., in an Internet phone product. An Internet phone application decodes the encoded audio data and plays the transmitted data at a subscriber's phone. The above-described applications have the drawback that the encoded audio stream is a large amount of data which must be encoded and even after encoding the audio data may be slow in traversing the Internet. In addition, the current state of the art audio products require the use of a computer to access the audio services.

One current state of the art attempt to overcome the aforementioned problem of not having access to a computer has been to provide a service which recite verbatim an existing WWW page to a user. The service can be accessed by the user through establishing a voice connection to the service. This solution has the drawback that existing Web pages include text with embedded links, for example, to other addresses of resources which is difficult to read and to be understood by the user. Also, numeric and spreadsheet data which are typically represented in a two dimensional visual table are difficult to convert to speech and even if the table is converted to speech, the amount of data in the table is difficult for the user to understand and remember.

In summary, existing approaches to make information available on the world wide web accessible over an audio interie involve an automatic translation of html documents into audio. However, this process cannot be fully automated, and in general such an approach is not extensible beyond simple text-only pages. For instance, it cannot be used to represent numeric data, spreadsheets, tables and databases effectively.

SUMMARY OF THE INVASION

Briefly described, the present invention relates to a system and method for providing access to internet resources with a telephone. The process uses defined steps to represent information to be presented over audio. The system and method are used to represent different kinds of information existing on the web in a form suitable for access over a variety of audio interfaces which include touch tone and speech recognition.

Audio enabled pages are created to link particular text data, which data can be from conventional Web pages. Audio enabled pages are stored at an audio web server or on individual user machines. An authoring language audio text manipulation language, referred to as ATML, can be used for generating the audio enabled pages. An audio web server translates the audio enabled pages into audio. The audio enabled pages form an "Audio Web", similar to conventional HTML authored pages forming the current Internet and World Wide Web. Accordingly, the system of the present invention has the advantage that it is not necessary for the user to have Internet account to use the Audio Web. A user can access audio enabled pages through the Audio Web with a conventional audio interface, such as a phone, and can create audio enabled pages with the audio interface.

The system includes at least one audio web server can be accessed by the user with a telephone. The audio web servers include call processing features for processing the user's call. Also, the audio web servers provide text to speech conversions to translate text data represented in audio enabled pages into audio. In addition, the audio web servers can include conventional speech to text converting hardware or software. The speech to text conversion is used to enable a user to access an audio enabled page with spoken input. Instead of entering "My stock" from the keypad, the user can say "My stock" and obtain an audio enabled page. Speech recognition has the advantage of making search and indexing tools easier to use. The ambiguities of speech recognition can be resoled using audio input menus listing all possible interpretations of the ambiguous word. Typically, a user's call is routed to the audio web server which is closest in proximity to the user's telephone network, i.e., within the user's local calling area.

In operation, a user calls a dedicated name, for example, 1-800-AWEB and is connected to an audio web server. Upon connecting with the audio web server, the user is queried by the audio web server with audio input means to allow the user to select data from an audio enabled page. Selection by the user results in an audio enabled page being brought into the audio web server. If the audio enabled page is located remotely from the audio web server, a protocol such as http is used to connect the audio web server to a universal resource locator (URL). The URL is a physical address in terms of the WWW where the audio enabled page is actually residing. The audio enabled page is received at the audio web server and converted into audio at the audio web server.

The main challenge in authoring the audio enabled pages is that it takes a number of audio enabled pages to represent the same information as one conventional "visual" page authored in HTML. For example, a two dimensional conventional table which may be accessed on the Internet has four columns representing different markets (NASDAQ, NYSE, AMEX and DOW) and a number of rows corresponding to different indexes (utilities, transportation . . . ). Audio access to the above table can be created by asking the user first for the column and then for the row (or vice versa). Audio access for the two dimensional table uses N×M+2 pages (one page to ask for the market selection, another for the index selection and N×M pages to store the proper values to be read in which N is the number of columns and M is the number of rows in the table). Accordingly, the Audio Web formed of audio enabled pages is more "dense" or requires more pages to represent a two dimensional table than the WWW.

The present invention provides a method for generating audio enabled pages in which links are established between a user's keypad of a phone and audio enabled pages. A user audio input menu is created for requesting the user to enter data from the keypad to access information of data files. In addition the method creates user audio input menus to traverse links of audio enabled pages. Alternatively, speech recognition of commands spoken by the user can be used to establish user input accessing and creating audio pages.

A method is also provided for generating dynamic audio input menus to selectively traverse a database. Attributes of the database are defined as Identifier attributes, specifying headings of the database and Target attributes, specifying values in the database. Rules are determined for controlling the flow of user input into the dynamic input audio menus. The rules include ambiguity resolution of user input values. A graphical representation of the attributes can be used to determine the selective ordering of attributes in the dynamic audio input menu.

The system and method of the present invention can establish user profiles so that a user can form one larger concatenated numbers keywords to reach a particular audio enabled page directly without having to listen to the sequence of the dynamic audio input menus. Thus, for example, after being verified, the user can dial "MY STOCK" and this will automatically provide him with the latest quotes of his stock portfolio. Additionally, similar to HTML, the user can form a "Hot" list of the most frequently visited audio enabled pages.

In summary, a user can access audio enabled pages which can be located at URL to form an Audio Web. It will be realized that only certain types of currently provided Web pages are good candidates for conversion into an audio enabled page. For example, an audio enabled page would have limited use for converting image data of a WWW page. Current WWW information service include numerous applications such as financial (stock quotes, mortgage calculators), weather, traffic, entertainment information which can be advantageously accessed using Audio Web technology from any phone, including pay phones without a user having to carry a computer, no matter how small the computer could be made. Additionally, Audio Web resources can be advantageously accessed by handicapped (blind) users when the audio enabled pages are combined with speech recognition. The invention will be more fully described by reference to the following drawings.

DETAILED DESCRIPTION OF THE PREFERRED EMBODIMENT

During the course of this description, like numbers will be used to identify like elements according to the different figures which illustrate the invention.

Figure 1:
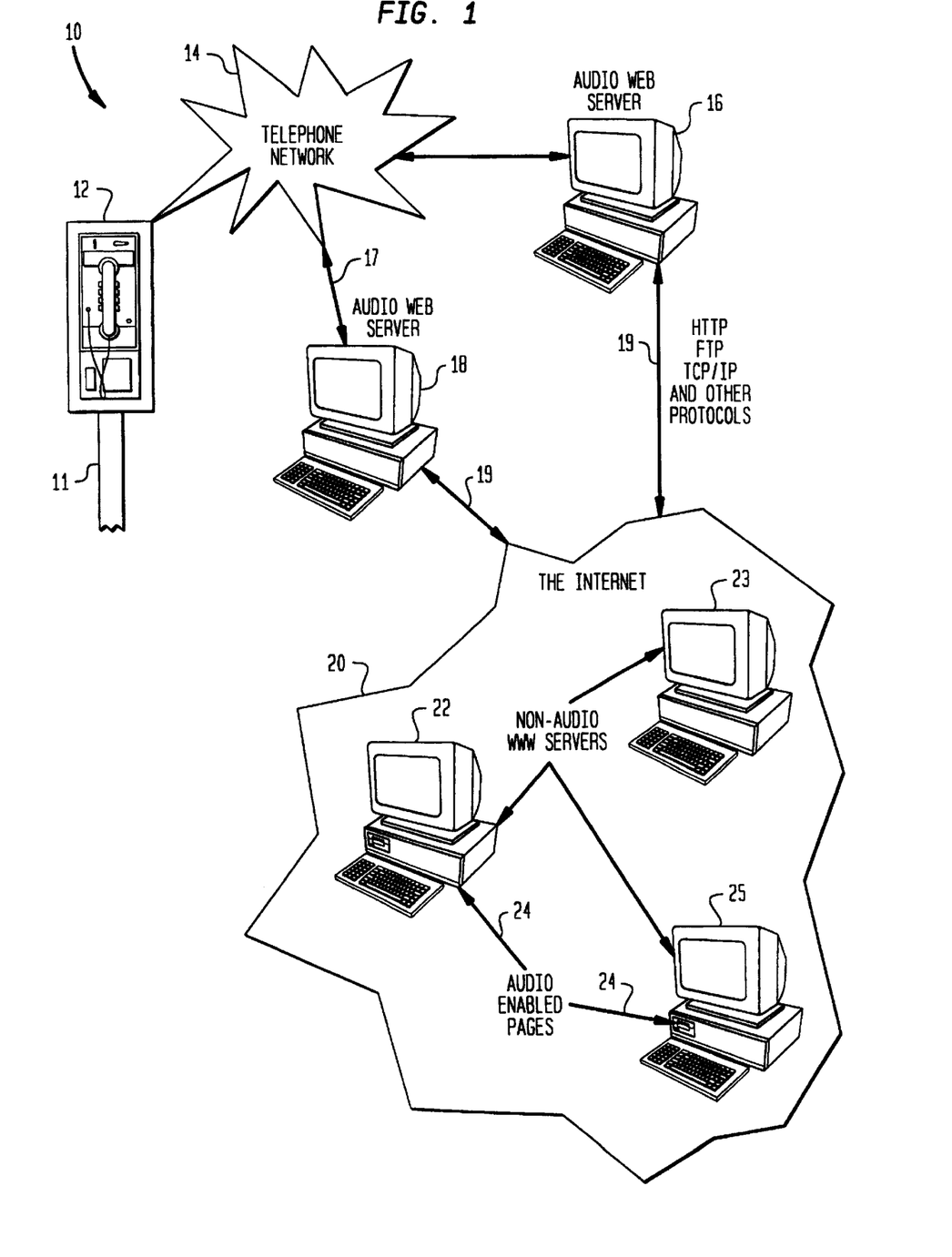
FIG. 1 is a schematic diagram of a system for providing audio access in a wide area computer network of the present invention.

FIG. 1 provides a schematic diagram of a system for audio access in a wide area computer network 10 in accordance with the teachings of the present invention. User 11 uses phone 12 to connect to a conventional telephone network 14. Phone 12 can be any audio interface including cellular phones, speaker phones, pay phones and touch tone phones. Telephone network 14 connects to an audio web server 16, 18 over audio connection 17. Preferably, telephone network 14 connects to the audio web server 16 or 18 which is closes in proximity to user 11. For example, telephone network 14 would first try to connect to the audio web server 16 or 18 which is located in the same area code or local exchange as phone 12. If no audio web servers are in the same area code or local exchange, telephone network 14 would connect to an audio web server 16 or 18 located in an area code different than user 12. It will be appreciated that any number of audio web servers can be established based on the number of users 11 of system 10.

Audio web servers 16, 18 connect to a wide area computer network 20, i.e., the Internet over data connection 19. Audio web servers 16, 18 receive text data which can be audio enabled pages or text files over data connection 19 from wide area computer network 20 using conventional protocols such as http, ftp, and tcpfip. Audio web servers 16, 18 convert the received text data into audio. Audio web servers 16, 18 transmit the audio over audio connection 17 to telephone network 14 which provides the audio to user 11.

Conventional information services or content providers reside on non-audio WWW servers 22, 23, in wide area computer network 20. For example, information services can include a home page dispatcher, i.e., magazines and newspapers; search engines, i.e., Infoseek, and; generic home page owner. Currently, there are many companies on the WWW that allow users to query their databases. The WWW services typically return to the user a set of answers corresponding to the user's query from the database of a WWW service. For example, a stock market information provider may have a WWW site that allows a user to obtain a stock quote for a particular stock on a particular stock exchange.

Audio enabled pages 24 are generated in a language referred to as audio text markup language (ATML) for enabling information to be displayed as audio to user 11. Audio enabled pages 24 can be generated from data residing on non-audio WWW servers 22, 23. Audio enabled pages can be lined in order to include data residing in other audio enabled pages 24. Audio enabled pages 24 can reside in memory of non-audio WWW servers 22, 23. Alternatively, audio enabled pages 24 can reside at an audio Web user's location 25 or at audio web servers 16, 18. Audio enabled pages 24 are interpreted by audio web servers 16, 18 for displaying the linked data as audio to telephone network 14, which will be described in more detail below.

Figure 2:
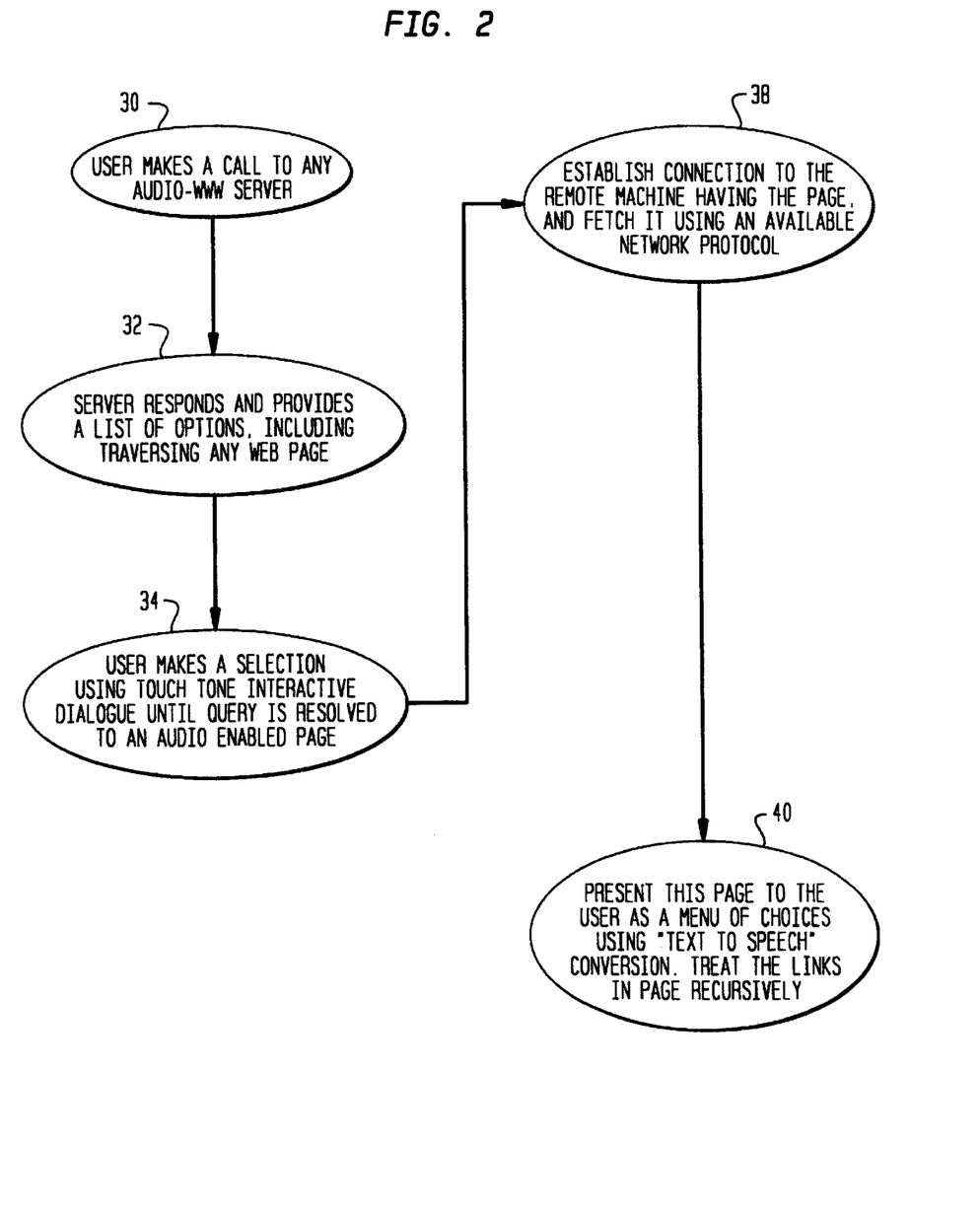
FIG. 2 is a flow diagram of the progress of an audio application using the system shown in FIG. 1.

FIG. 2 illustrates a flow diagram of progress of an audio application using system 10. In block 30, user 11 uses telephone network 14 to call an audio web server 16, 18. For example, user 11 can call an audio server 16,18 by dialing 1-800-GOA-UWEB with phone 12. Audio web server 16, 18 responds to the call and provides a list of options to the user in block 32. For example, the options can include traversing any audio enabled page 24 by entering the address of the audio enabled page 24 with the keypad of phone 12. In block 34, user 11 makes selections until a query is resolved to an audio enabled page 24 using touch tone interactive dialogue. For example, user 11 can make selections from the keypad of phone 12. The following is a typical scenario of the interaction between user 11 and audio web server 16, 18 in blocks 32 and 34.

User: Dials 1-800-GOA-UWEB

Audio Web Server: Responds, "Hello, you have reached 1-800-AWEB site. Please identify yourself."

User: Types his user name with phone keypad

Audio Web Server: Responds, "Password"

User: Types his password with phone keypad

Audio Web Server: Queries, "if you know the address of the page you want to reach, please dial it now."

Audio Web Server: Queries, "Otherwise Press 1 for E-mail."

Audio Web Server: Queries, "Press 2 for HOT LIST (BookMarks)"

If the option for E-mail is selected by the user, the user's E-mail can be sent over phone 12. The Hot List option is used to keep a profile of a user's preferred audio enabled pages 24. The Hot List of audio enabled pages 24 can be further organized into a user dependent directory. The user dependent directory can be accessed by user 11 interacting with audio web server 16, 18. The following is an example of a created user dependent directory as queried from audio web server 16, 18.

Audio Web Server:

Press 1 for IBM Stock Quote

Press 2 for traffic on 27

Press 3 for weather in New Brunswick

Press 4 for the events in "Old Bay" this week.

In block 34, user 11 can also be requested by audio web server 16, 18 to enter data via the keypad of phone 12. For example, after user 11 presses " " for IBM Stock Quote, user 11 can be requested by audio server web 16, 18 to enter a value for the stock, i.e., high or low. In block 36, a decision is made as to whether the selected audio enabled page 24 resides locally on audio web server 16, 18 or remotely from audio web server 16, 18. If the audio enabled page 24 locally resides on audio web server 16, 18. The audio web servers 16, 18 convert the text data of audio enabled pages 24 to audio for transmission of audio to user 11 in block 40. The audio enabled page can be presented to user 11 as a menu of choices. These audio enabled pages 24 are established with audio page links to allow a user to recursively traverse a page, as described in more detail below. Audio page licks can be read to a user upon pressing predetermined numbers of the keypad of phone 12. For example, audio server 16, 18 can prompt user 11 with the following response: "Press 3 for weather".

Alternatively, if the audio enabled page 24 resides remotely of audio web server 16, 18, a connection is established to the address of the audio enabled pages 24 in block 38. The address of the audio enabled page 24 can be a conventional URL. Audio enabled pages 24 are transmitted to audio web servers 16, 18 as text data with standard http, ftp, tcp/ip or other protocols known in the art. The audio enabled page 24 transmitted to audio web server 16, 18. The audio enabled page 24 is transmitted to user 11 as audio in block 40.

Alternatively, speech recognition can be used at audio web servers 16, 18 to interpret words spoken by user 11 into selections to the menu without using a keypad. A speech index can be generated of spoken words to provide search capabilities in a similar manner as WWW indexes. Each audio enabled page 24 has a "context" to understand and resolve the spoken commands. The use of a context makes it easer to interpret commands since the vocabulary will be limited. Additionally, global and local commands can be recognized for each audio enabled page 24. For example, a spoken command "Links" can refer to a global command that results in all links originating from a given audio enabled page being read to user 11. Similarly, spoken commands, such as "Forward" and "Back" can result in forward and backward linking to audio enabled pages 24. Spoken commands, such as "Index" and "Email" and "Hotlink" can be used to link to audio enabled pages as discussed above. Local commands can act like "local variables" to be interpreted in the context of the given page. An example of a local command is as follows. The spoken command "Order the ticket" can be used "If you would like to order the ticket" with an audio enabled page. The spoken command can be viewed as a member of the audio enabled page's context or dictionary. The audio enabled page's context can be defined as a union of all global terms and local terms. The global and local terms can be downloaded together with the audio enabled page 24 to the audio web server 16, 18. The speech index can be organized as a tree with nodes represented as audio enabled pages with the "context" limited to the global and local terms.

Figure 3:
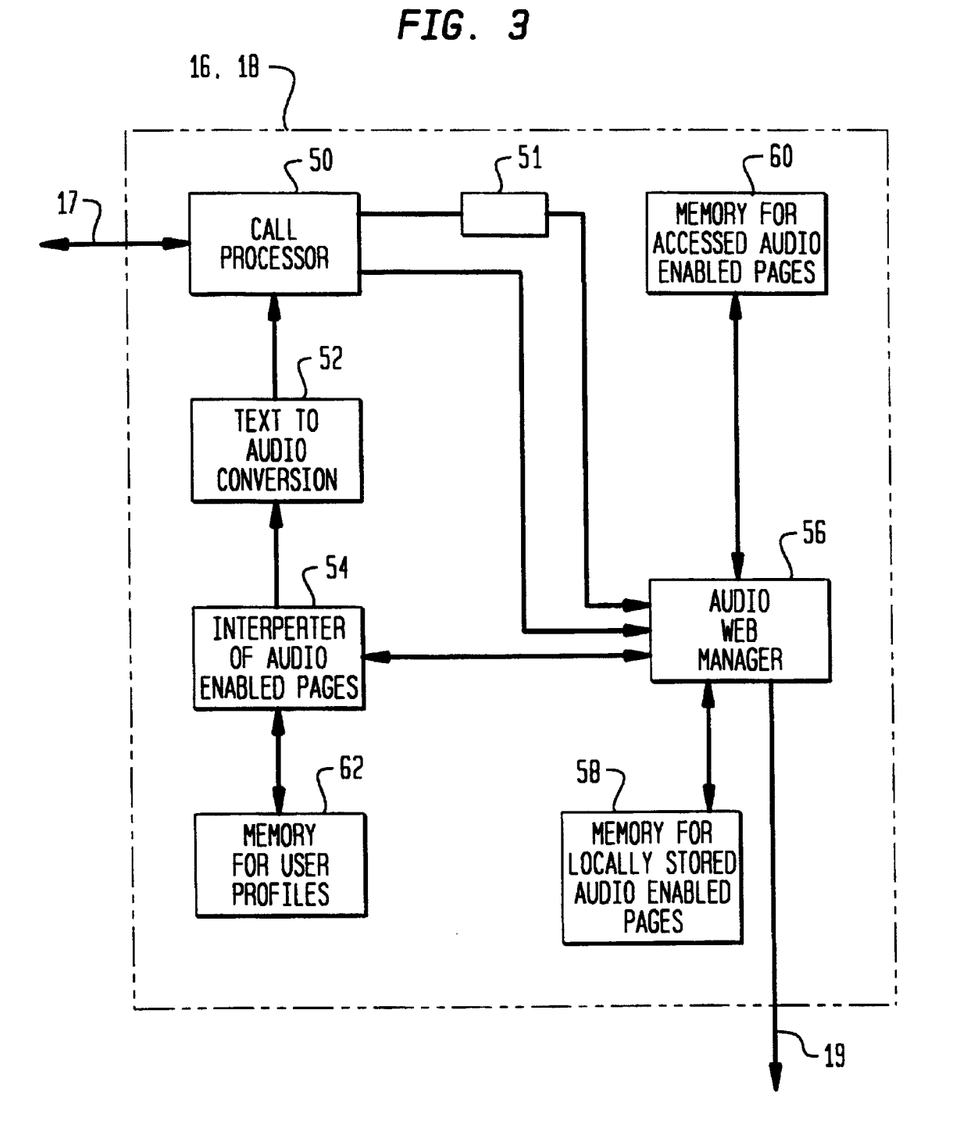
FIG. 3 is a schematic diagram of an audio web server of the present invention.

FIG. 3 illustrates a schematic diagram of audio web server 16, 18. For example, audio web server 16, 18 can be a pentium 200 running Windows NT 4.0. Call processor 50 receives requests for establishing a call to audio web server 16, 18 over connection 17 from telephone network 14. Call processor 50 establishes, maintains and terminates calls between telephone network 14 and audio web server 16, 18. An example of a call processor useful for practice of the present invention is manufactured by Dialogic as dual span series T-1/E-i, ISDN, PRI.

Call processor 50 establishes a link to audio web manager 56. Selections entered from the keypad of phone 12 to establish a connection to an audio enabled page 24 are transmitted from call processor 50 to audio web manager 56. Alternatively, spoken command selections can be transmitted from call processor 50 to speech text converter 51 for converting the spoken commands into text. The converted text is forwarded to audio web manager 56. Audio web manager 56 establishes electronic connections 19 to wide area computer network 20 for accessing audio enabled pages 24 which are located remotely of audio web server 16, 18. Upon a predetermined selection by user 11, audio enabled pages 24 can be retrieved from a URL located in wide area computer network 20 and stored in memory for accessed audio enabled pages 60. An interpreter of audio enabled pages 54 interprets audio enabled pages 24 into text data. Text to audio converter 52 converts text data from interpreter 54 to audio. The audio is transmitted from call processor 50 to user 11. An example of a text to audio converter useful for practice of the present invention is AT&T Watson text to speech software or DECTALK. Audio Web server 18 can include memory for locally storing audio enabled pages 58. User profiles directed to predetermined user links, referred to as Hot irks, can be stored in memory for user profiles 62.

Figure 4:
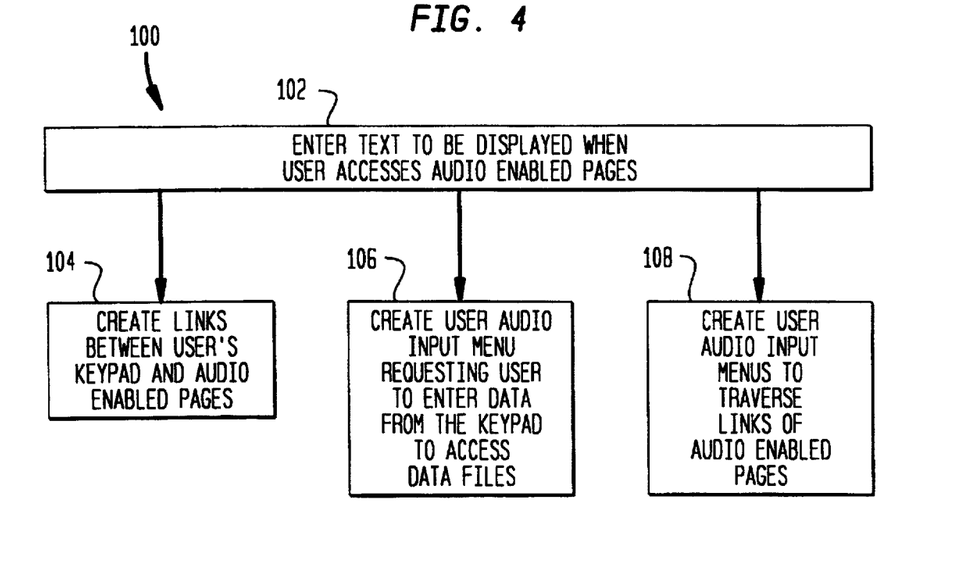
FIG. 4 is a flow diagram of a method for generating audio enabled pages of the present invention.

FIG. 4 illustrates a flow diagram of a method for generating audio enabled pages 100. In block 102, text to be displayed as a welcome message for an audio enabled page 24 is determined. A command referred to as "TEXT" can be used to generate the message. The combination of the below described commands for authoring audio enabled pages is referred to as ATML. The audio enabled pages 24 are generated with a conventional text editor or with a graphical software interface such as TCL-TK, as described in Introduction to TCL_Tk by John Ousterhout. An example of the format of the TET command is:

TEXT="Hello, you've requested the audio stock quote reporting page."

In block 104, links between a user's telephone keypad and audio enabled pages 24 are determined. A command referred to as "LINK" can be used to identify an audio prompt for the user and a link to an audio enabled page 24. An example of a format of a LINK command is as follows:

LINK=number: prompt: file.atml.

In the LINK command, the term "number" indicates the number of the keypad which can be pressed by user 11 to access an audio enabled page 24. The audio enabled page is referred to with the term "file.atml". The term "prompt" refers to an audio prompt which is spoken to the user. Preferably, when an audio enabled page 24 is translated by audio web server 16, 18, the prompts of all LINK commands in the audio enabled page 24 are spoken to user 11. Thereafter, if user 11 presses a number of the keypad specified by the LINK command. The audio enabled page liked to the specified number of the keypad is retrieved at audio web server 16, 18, either by locally accessing the audio enabled page 24 if it is stored locally at the audio server or remotely accessing the audio enabled page 24 by electronically connecting to the URL of the audio enabled page and forwarding audio enabled page 24 with a standard protocol to audio web server 16, 18. The retrieved audio enabled page 24 is stored as the parent page at audio server 16, 18.

In block 106, user input audio menus are created which request web user 11 to enter a plurality of data from the keypad of phone 12 or make spoken selection over phone 12 in order to access data files. Each piece of entered data is resolved into a section of a point key. The point key indexes a data file which can be used to answer a user's query. A command referred to as ENTER can be used for creating user input menus having the following format:

ENTER=prompt1:format1:validation_file1.db,
prompt2:format2:validation_file2.db,
promptn:formatn:validation_filen.db,
DataFileName.txt The terms "format 1", "format 2" ... "format n", identify the format to be used by user 11 when entering data from the keypad of phone 12. For example, the format can be represented by terms "(d)+#" which translate into "Read all digits of the data entered from the keypad of a user phone until a # sign is seen". This format is used in cases in which input length of data to be entered by a user from the keypad of phone 12 is not known apriori. Alternatively, the format can be represented by the terms "d(n)" which translates into the command "read up to first n digits" of the data entered from the keypad of a phone 12 at audio web server 16, 18. This format can be used in cases where it is known that a fixed number of digits are used to represent data entered from the keypad. The term "prompt" can be used to refer to an audio prompt that is spoken to the user which may refer user to what input should be entered by the user into the input audio menu.

The term "DataFileName.txt" is used to refer to an output datafile to be accessed by audio saver 16, 18. The output datafile includes pieces of data indexed by the point key. A user read-ahead is possible to allow a user 11 that is familiar with the audio input menu to enter data from the keypad even before the prompts are issued. For example, user 11 could enter all information from prompt 1, ... promptn after hearing prompt1 of the user input audio menu for generating the output datafile.

An ENTER command having a format such as ENTER=datafile.text can be used to read the entire contents of a data file. For example, the command ENTER=current_weather.text can be used to read the contents of a current weather file.

The following is an example for generating an audio enabled pages 24 and user input audio menu is example includes three audio enabled pages, three data files and one output file indicating the answer to the user's query. The following commands are used in forming a user input audio menu as an audio enabled page.

TEXT=Welcome to the home page of Audio Mosaic.
LINK=1:Press one for stocks:stock.atml
LINK=2:Press two for weather:wthr.atml
TEXT='Message if the user hits an illegal key combination'

In this scenario, the following commands are used for generating a second audio enabled page referred to as stock.atml.

TEXT=You have reached the stock page.
ENTER=Enter first three ticker digits:ddd:tickfile.db,
Enter Stock Market:(d)+#:stockfile.db,
Enter hi or lo:dd:hilo_validate.db,
database.txt The .db files are used to provide a context of all choices that user 11 can enter. The .db file provides information which can be readily used by a speech recognition application or for resolving ambiguities of inputted data.

For example, the tickfile.db file can contain the following examples of ticker symbols (some of them are not currently listed on a recognized stock exchange such as:

IBM
AAPL
T

For example, the stockfile.db file can contain the domain of predetermined stock markets such as:

NYSE
NASDAQ

For example, the hilo_validate.db file can contain a set of answers to the query of hi or low for the predetermined stock such as:
hi
lo The output file represented by the terms "database.txt" can be a file in which data to be provided to user 11 is stored and can be indexed by each possible key combination which can be entered by user 11. For example, the contents of the output file can be the following:
IBM,NYSE,lo:71.5
IBM,NYSE,hi:74.6
AAPL, NASDAQlo:45.5
APPL,NASDAQ,hi:Unavailable
T,NYSE,lo:54.5
T,NYSE,hi:85.5

The following commands are used for generating a third audio enabled page, i.e., weather referred to as wthr.atml.
TEXT=You have reached the weather page.
ENTER=current_weather.txt The block 108, a user input audio menus are generated for traversing links of audio enabled pages. A command referred to as "JUMPT0", can be used to link input of a user to an audio enabled page. For example, JUMPTO can have the following format:
JUMPTO:format:file.atml The JUMPTO command can be used to traverse links of audio enabled pages 24 based on a value entered by user 11. For example, the following scenario links user's input of five digit zip codes to audio enabled pages 24.
JUMPTO
  08854: page 2. atml
  08807: page 3. atml
  08901: page 4. atml.
  [JUMPEND]

Figure 5:
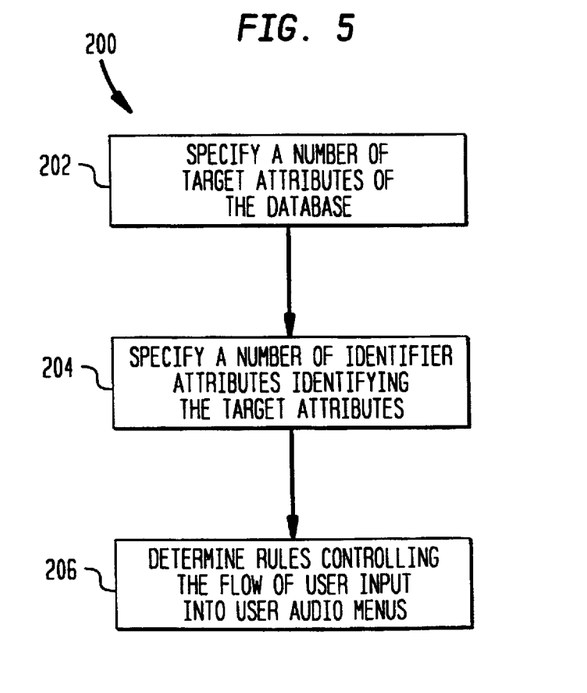
FIG. 5 is a flow diagram of a method for generating dynamic input audio menus to selectively traverse a database of the present invention.

FIG. 5 illustrates a method for generating dynamic user input audio menus 200 for selectively traversing a database. The dynamic user input audio menus 200 provide database access by automatically generating a hierarchy of audio enabled pages 24. The dynamic user audio menus 200 automatically change when changes are made to audio enabled pages 24 without any intervention of user 11.

The database can be represented as having two types of attributes. The first attribute of the database is referred to as an "Identifier" which represents a key to represent one or more of the column or row identification headings used in the database. For example, if the database is related to a two dimensional table of stock quotes, a first Identifier can represent a row of the table, i.e., type of stock and a second Identifier can represent a column of a table, i.e., Hi. A second attribute of the database is referred to as a "Target" which represents the value stored in the database which is referenced by the Identifier. For example, an Identifiers, Hi" related to an Identifier for IBM may have a value stored in the database for IBM as 130 which is the Target.

In block 202, a number of Target attributes to be used for the database are specified. A command with the following format can be used to identify Target attributes:
GENERATE ACCESS FOR (Target 1) (Target 2)
  . . . (Target N)

A number of Identifier attributes identifying the Target attributes, specified in block 202, are specified in block 204. A command with the following format can be used to specify Identifiers:
IDENTIFIED BY (Identifier 1) (Identifier 2)
  . . . (Identifier N)

In block 206, rules for controlling the flow of a user's input for generating audio dynamic input menus are determined. A command referred to as "CONFIG" represents the format of the rules for controlling the flow of the user's data A command referred to as "USING" can have the following format:
USING
CONFIG=Config file name In this case, the rules are stored in a file identified as config file name.

The following is an example of creating a dynamic input audio menu for database access blocks 202–206
GENERATE ACCESS FOR
  (current, hi, lo) (trading_volume)
IDENTIFIED BY
  ticker, stockmarket, PAC|SSN (–4)
USING
  stockmarket+ticker In an alternate embodiment, the USING command can have the following format:
USING
CONFIG=RULE 1, RULE 2 . . . RULEN In this case, the rules are specified in the CONFIG command.

This embodiment is used for cases in which there are a limited number of rules, rules used for controlling the flow of user input for example, 5. Preferably, the rules of the present invention are used to minimize the length of created dynamic user input audio menus and provide ambiguity resolution of user 11 input into the dynamic user input audio menus. The rules include conditions for selectively determining the target order of attributes which will be accessed in the dynamic user input audio menu, thereby establishing the hierarchy of audio enabled pages 24 to represent the dynamic user input audio menu.

Preferably, the rules are specified with variables related to actions which can be inputted by the user and actions controlling the flow of data to be stored as a linked tree. Examples of variables which can be used for specifying the rules are as follows:

TERM_CHAR='#' can be used to specify the character to be used to terminate user input. The created dynamic input user audio menu can prompt a user to perform an action before entering the specified TERM_CHAR value. For example, the following prompt can be read to a user:
Enter ticket symbol terminated by #

EAS_CHAR='1' can be used to specify a character to be used to terminate the current linked tree and bring the user back to the root of the tree.

SWITCH_VAL='5' can be used to specie that a specified portion of an answer of a query be forwarded to a user. For example, the generated dynamic user input audio menu will ask questions to user 11 as follows:
Press 1 for val1, 2 for val2 . . 5 for val5.

If when there are more than five values, the dynamic user input audio menu can enter a value for attrib X.

CANT_ASK=X,Y can be used to indicate that attributes X and Y are not known to the user, and the user is not able to enter values for them. In this case, the value of SWITCH_VAL is infinite.

The following agents can be used on the command line of the GENERATE ACCESS for command. A database argument can be used to identify a database to be converted to an audio enabled page. The database argument can be represented with command line option -db 'database', wherein 'database' is replaced with a database name.

A table name argument can be used to identify a table which is to be to converted to an audio enabled page. The table name argument can be represented with a command line option as: -tbl 'table name' wherein 'table name' is replaced with a table name. The table can be part of the database referred to above.

An output attribute list to specify attributes can be used in generating the answer to a user's query in combination with converting a database or table. The output attribute list arguement can be represented with a command line option: such as -attr 'attr_1', 'attr_2', . . . 'attr_n wherein attr_i' is replaced with an attribute name represented with -tbl option. If no output attributes are specified all columns will be used to generate the audio enabled page directed to the table or database.

A query attribute argument of the table or database can be used to identify attributes that are used in the answer to a query of user. This information can be used to generate a tree of audio enabled pages 24 that let the user reach the final answer through a series of dialog, which is provided when the audio enabled pages 24 are executed by the interpreter in the audio web server. In addition, the information specified in this option provides "query scenarios" by asking the user to provide the exact value of a certain attribute and selection conditions on a certain attribute if an ambiguity results from a keyboard entry from the user, as described in more detail below with reference to FIG. 6.

The query attribute database option argument can be represented with a command with a command line option such as: -qatters 'query attribute specification', wherein 'query attribute specification' is replaced with a string of text describing information about choosing attributes.

An order preference output argument can be used to override reordering of query columns determined in the answer to the user's query in the argument. A command line option can be used such as: -pref'attr_1'<'attr_2', 'attr_3'<'attr_4', . . . , 'att_n'', where 'attr_i' should be replaced with a proper attribute name in the table specified in -tbl option to indicate that attribute is preferable over attributes 2, attribute 2 is preferable over attribute 3 . . . attr_n'.

A number of letters or digits argument can be used for limiting the number of values used in a query. The function includes any argument indicating the number of digits which can be used to limit the query. The function includes any argument indicating the number of digits which can be used to limit the query. For example, a function movie name (3) indicates the first three letters of the move name can be entered in a user's query in order to resolve the query.

An output directory name argument can be used to specify the directory to contain generated audio enabled pages. The output directory name argument can be represented with a command line option such as: -odir 'directory'.

Figure 6:
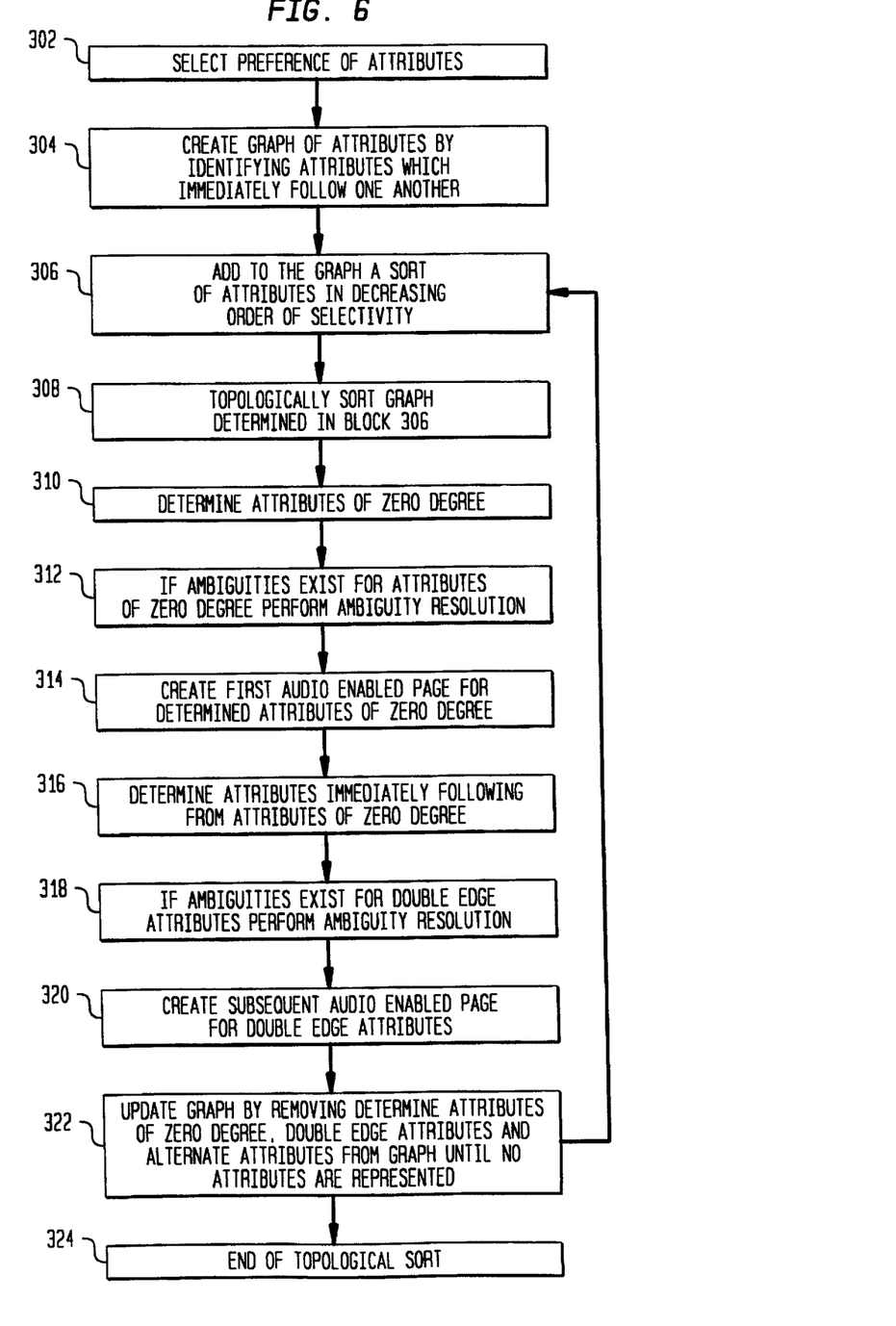
FIG. 6 is a flow diagram of a method for selecting the order of attributes in the dynamic input audio menus of the present invention

FIG. 6 represents a flow diagram of a preferred embodiment of a method for selecting the order of attributes for generating a dynamic user input audio menu 300. The attributes can be Identifier attributes. In this embodiment, the creator of the dynamic user input audio menu determines the selectivity of preference for attributes in block 302. For example, a user's preference could be to have an attribute, A, such as "last name" immediately follow an attribute, B, such as "first name". In an alternate embodiment, the frequency of usage of an attribute by user 11 can be used to determine the selectivity of attributes.

In block 304, a graph is generated from attributes which must immediately follow one another. This condition can be represented in the graph by a double edge from attribute A to attribute B if attribute B immediately follows attribute A.

Remaining attributes in decreasing order of selectivity are added to the graph in block 306. This condition can be represented in the graph as an edge from attribute A to attribute B if attribute A has a higher selectivity than attribute B. In block 308, a topological sort of the graph.

Thereafter in block 310, attributes of zero degree are determined. An attribute of zero degree is used to refer to an attribute having no incoming edges such there are no attribute which are superior. If ambiguities exist for attributes of zero degree of ambiguity resolution is performed in block 312. There are two kinds of ambiguities which are possible for attributes. A first type of antiquity is due to the ambiguous translation of keypad digits of phone 12 to match a letter field in the database. For example, since numbers on the keypad represent more than one letter, a sequence of number pressed on the keypad can define two different last names. A second type of ambiguity results if the touch-tone to letter mapping is uniquely identified words, i.e., two different, but there is more than one entry in the database which matches a keyword (in this case, more than one row).

The second type of ambiguity can be resolved by determining the next IDENTIFIER attribute to ask a question about. The first type of ambiguity can be modified so that it can be handled in the same manner as the second type of ambiguity. For every alphabetic attribute, two attributes A' and A are created wherein A' is the digitized representation of A. A constraint is added to the rules for controlling flow of user input into the dynamic user input audio menu that a question about A must IMMEDIATELY follow a question about A' for reducing the first type of ambiguity into the second type of ambiguity. The following is an example of the above described scenario".

Cars:

Toyota Camry

Honda Accord

Lexus LS300

Dodge Caravan

The attributes of cars can be translated into a menu of the form: 'Cars'

. . .

8686

4663

4663

5398

3534 wherein the numbers represent the first four letters of the spelling of the car.

Menu: "Enter first 4 letters". A first question asked to user 11 from dynamic user input audio menu is to enter the first 4 letters of the car User enters: 4663

This selection is mapped to two records in the database which are Honda Accord and Honda Civic. The constraint on the next question relates to a question about access. An example of a question is as follows:

"Press 1 for Honda Accord, 2 for Honda Civic"

A user makes a choice to the dynamic input user menu for uniquely selecting the attribute which they want to access.

In block 314, a first audio enabled page 24 is determined for attributes of zero degree. A determination is made if any attributes immediately follow the determined attribute of zero degree in block 316. The determination can be performed by determining all edges outgoing from the attribute of zero degree.

If ambiguities exist for any determined double edge attributes, ambiguity resolution, as described above, is performed in block 318. In block 320, an audio enabled page 24 is created for the double edge attribute determined in block 318. Preferably, this subsequent audio enabled page 24 is linked to the first audio enabled page 24 created in block 314.

The rules can also be determine by alternate attributes in the Identifiers list. An example is where a user could be identified by either a personal access code or the last four digits of a user's social security number, but not both. In block 320, a subsequent audio enabled page is created which can be accessed by either of the alternate attributes.

In block 322, the graph is updated by removing determined attributes of zero degree from block 310 and double edge attributes and alternate attributes from block 316. If additional tributes exist in the updated graph, blocks 306 through 322 are repeated. If after block 322 no attributes are represented by the graph, the topological sort of the graph ends in block 324.

The rules can also be determined by a user imposed hierarchy Irrespective of the method represented in FIG. 6 a user can impose a condition that an attribute, X, must be asked before an attribute Y with a command line argument to order of preference.

X>Y.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

We claim:

1. A system for providing audio access to resources in a wide area network comprising:
   means for generating an audio enabled page by selectively choosing linked data from said resources;
   an audio web server providing text to audio conversion of said audio enabled page;
   means for establishing a connection to said audio web server from an audio interface;
   means for selecting information from said audio enabled page in response to input entered over said connection, said input establishing links to said audio enabled page;
   means for generating user input audio menus to traverse said links of said audio enabled pages, said input being entered from said user input audio menus; and
   means for retrieving said selected information;
   wherein said retrieved information is received as audio at said audio interface.

2. The system of claim 1 wherein said audio enabled page is stored remotely of said audio web server at a universal resource locator and further comprising:
   means for electronically connecting said audio server to said universal resource locator to form an electronic connection; and
   means for retrieving said audio enabled page over said electronic connection.

3. The system of claim 1 wherein said audio enabled page is stored at said audio web server.

4. The system of claim 1 wherein said input is entered from a keypad of a phone of a user said system.

5. The system of claim 4 wherein said links are established between said keypad and said audio enabled page.

6. The system of claim 1 wherein said audio web server further comprises:
   means for converting speech to text,
   wherein said input is speech spoken from a user of said system into said means for converting speech to text.

7. The system of claim 1 wherein said means for establishing a connection to said audio web server comprises a call processor in said audio web server.

8. The system of claim 1 wherein said resource is a database and said means for generating user input audio menus generates dynamic user input audio menus for selectively traversing said database in which a graphical representation is used to determine selective ordering of database attributes accessed by said dynamic user input audio menus.

9. A method for providing audio access to resources in a wide area network comprising the steps of:
   a. generating an audio enabled page by selectively choosing linked data from said resources;
   b. generating at least one link from input entered by a user at an audio interface to said audio enabled page;
   c. determining a query from said links, said query being entered from said audio interface to an audio web server;
   d. selecting information from said audio enabled page in response to said query;
   e. retrieving the selected information from said audio enabled page at said audio web server;
   f. converting said retrieved information into audio; and
   g. displaying said retrieved information at said audio interface.

10. The method of claim 9 wherein step a further comprises the steps of:
    entering text to be displayed when said audio enabled page is retrieved.

11. The method of claim 10 wherein said link is established between a number of a keypad of a phone and said audio enabled page and said keypad is used to generate said query and further comprising the step of:
    generating a prompt related to said link; and
    displaying said prompt as audio at said audio interface.

12. The method of claim 11 further comprising the steps of:
    providing a second prompt requesting entry of information in a predetermined format;
    indexing database information with the requested information; and
    outputting the indexed database information into an output data file.

13. The method of claim 9 further comprising the steps of:
    storing said audio enabled page at a universal resource locator and electronically connecting said audio server to said universal resource locator for retrieving the stored audio enabled page.

14. The method of claim 9 further comprising the step of:
    converting spoken commands into text,
    wherein said spoken commands are used to generate said input entered by said user.

15. The method of claim 9 wherein said resource is a database and further comprising the steps of.
    h. determining at least one Target attribute of said database;
    i. determining at least one Identifier attribute of said Target attribute; and j. determining rules for controlling flow of user input into dynamic user input audio menus from said target attribute and said Identifier attribute.

16. The method of claim 15 wherein said dynamic user input audio menus are generated by the steps of:
   k. selecting a preference attribute of said Target and said Identifier attribute;
   l. identifying said attributes which immediately follow one another;
   m. creating a graph of said attributes which immediately follow one another;
   n. sorting the remaining attributes in decreasing order of selectivity;
   o. adding to said graph said attributes in decreasing order of selectivity;
   p. topologically sorting said graph;
   q. determining attributes of zero degree;
   r. creating a first audio enabled page for determined attributes of zero degree;
   s. determining double edge attributes;
   t. creating a second audio enabled page for each of said double edge attributes; and
   u. updating said graph by removing the determined attributes of zero degree and the determined double edge attributes from said graph.

17. The method of claim 16 further comprising the steps of:
   determining if ambiguities exist for said attributes of the zero degree; and
   performing ambiguity resolutions for the determined attributes of the zero degree.

18. The method of claim 17 further comprising the steps of:
   determining if ambiguities exist for said double edge attributes; and
   performing ambiguity resolution for said double edge attributes.

19. The method of claim 18 further comprising the steps of repeating steps o. through u. until all attributes are removed from said graph.

20. The method of claim 15 wherein step j. comprises the step of:
   specifying a character to be used to terminate user input.

21. The method of claim 15 further comprising the step of:
   linking a first said audio enabled page and at least one subsequent audio enabled page, thereby forming a linked tree.

22. The method of claim 21 further comprising the step of:
   specifying a character to be used to terminate said linked tree and bring a user back to the root of said linked tree.

23. A method of representing resources in a wide area network for audio access comprising the steps of:
   selecting linked data from said resources;
   creating links between said selected linked data to form an audio enabled page;
   translating said audio enabled page into audio; and
   displaying said audio at an audio interface.

24. The method of claim 23 wherein a TEXT command is used in said audio enabled page to generate an audio message to said audio interface.

25. The method of claim 23 wherein a LINK command is used for creating said links, said links linking a number of a keypad to said audio enabled page to form a linked audio enabled page, said LINK command being formed of a first identifier for said number of said keypad, a prompt which is displayed at said audio interface and a second identifier for said linked audio enabled page.

26. The method of claim 23 further comprising the step of:
   forming input audio menus for selecting said linked data and displaying said audio, said input audio menus being formed from an ENTER command, said ENTER command including at least one prompt and at least one format identifier to identify the format to be used for said input, an identifier of at least one resource to be accessed by said input audio menu and an identifier of an output file, said output file receiving said selected information from said at least one resource accessed by said input audio menu.

27. The method of claim 26 wherein said ENTER command further comprises:
   at least one prompt and at least one format identifier to identify the format to be used for said input.

28. The method of claim 23 further comprising the step of:
   traversing said links of said linked audio is enabled page, wherein a JUMPTO command is used for said traversing of said links, said JUMPTO command including at least one identifier of said input and at least one of said audio enabled pages to be linked to said identifier of said input.

29. The method of claim 23 further comprising the step of:
   generating a user profile for linking an input sequence to said audio enabled page, said input sequence being inputted by the user to said audio interface.

30. The system of claim 1 further comprising:
   means for linking a first said audio enabled page and at least one subsequent audio enabled page.

31. The system of claim 1 further comprising:
   means for terminating said user input with a specified character and bringing the user to a root of the linked tree of audio enabled pages.

* * * * *